FIG. 1

Inventor
Gerald L. Eaton
By his attorneys
Howson and Howson

FIG. 3

Inventor
Gerald L. Eaton
By his attorneys
Howson and Howson

Patented Aug. 18, 1953

2,649,403

UNITED STATES PATENT OFFICE 2,649,403

METHOD OF COKE-OVEN BY-PRODUCT RECOVERY

Gerald L. Eaton, Lansdowne, Pa., assignor to United Engineers & Constructors Inc., Philadelphia, Pa., a corporation of Delaware Application May 11, 1950, Serial No. 161,325

11 Claims. (Cl. 196—8)

This invention pertains to an improved method and apparatus for the recovery of by-products from hot coke oven gases.

In the production of coke, natural carbonaceous materials such as coal, lignite, peat or the like are heated in the absence of air with the production of certain gaseous by-products. Among these are tars, hydrocarbons such as benzene, naphthalene, various lower paraffins, olefins, nitrogenous compounds such as ammonia and hydrogen cyanide, as well as hydrogen and oxides of carbon.

The recovery of many of these materials, especially the valuable aromatic compounds, is economically desirable and so, over the years, many processes have been suggested whereby the efficient recovery of coke by-products can be accomplished. In the processes presently in use which are generally accepted as the most efficient, the hot gases coming from the coke ovens are subjected to a spray of aqueous flushing liquor. By this means their temperature is reduced from above about 800° C. to below about 50° C.; part of the ammonia present in the gas is absorbed in the aqueous liquor, and the tars, together with a large portion of the naphthalene, are condensed and carried away with the so-called "ammonia liquor." Usually, any tar remaining in the gas is then removed in an electrostatic precipitator.

The frictional resistance of the collecting mains and processing equipment is generally overcome by compression of the gas from below atmospheric pressure at the inlet of the compressors to a discharge pressure sufficiently high to overcome the frictional resistance of downstream apparatus and to pass the gas to a gas holder. Such a discharge pressure is usually from about 2 to about 4 p. s. i. g. The compression is normally carried out immediately ahead of or immediately following the electrostatic precipitators.

At this stage in the ordinary process, the gases are contacted with sulphuric acid to remove the remainder of the ammonia. They are then cooled by direct contact with water in large towers known as final coolers in which their temperature is reduced to from about 20 to about 40° C. with the resultant precipitation of some of the naphthalene content of the gas. From the final coolers the gases pass to benzol scrubbers where, at a pressure of about 0.5 to about 1.5 p. s. i. g., they are contacted with a wash oil, usually of petroleum origin, for the removal of the light oils and other aromatic compounds which they contain.

The process as outlined is open to a number of criticisms.

In the first place, the present method of producing naphthalene, which generally involves skimming it off the effluent from the final coolers, is cumbersome and inefficient. Generally, the product naphthalene is separated and purified by crystallization means, an awkward and inefficient process.

Moreover, a considerable quantity of naphthalene is retained in the gas at its vapor pressure and passes into the benzol scrubbers. Inasmuch as the naphthalene is not adequately recovered from the wash oil during the stripping operation, this oil is relatively saturated with naphthalene and is, therefore, ineffective to remove that contaminant from the gases passing through the benzol scrubbers. Thus a considerable quantity of naphthalene is contained in the final gas and causes clogging in the fuel mains and gas burners.

In addition, with the usual recovery system it is desirable to use a petroleum straw oil as the absorbent in the light oil scrubbers despite the fact that creosote oil (recovered from the tar by distillation) is known to have excellent absorptive properties. The reason for this is that creosote oil tends to sludge and polymerize more readily than petroleum wash oil and no really efficient or economical regenerative method for a creosote absorber oil has been proposed. Without regeneration the creosote oil would not be as suitable an absorbent.

Moreover, in the normal procedure naphthalene is present all through the recovery process. Even when the gas is discharged to the fuel lines, it is present in substantial quantities. The presence of this naphthalene causes precipitation in various parts of the apparatus where local cooling may occur. This precipitation results in the clogging and shutdown of such apparatus and piping. In the actual operation of present plants, naphthalene is found in almost every stage of the recovery process and to carry out the many functions in the presence of this contaminant causes considerable additional expense.

Still another problem which is of importance in present recovery methods involves the large volume of wash oil which is required to recover light oils from the gases. In addition to the initial and replacement costs of the oil itself, such a large volume requires a large steam consumption to heat the rich oil from the benzol scrubbers prior to the stripping operation. In addition, there is a large consumption of low pressure steam to do the stripping itself. For example, in the normal by-product plant, about 150 gals. of wash oil are circulated to the benzol scrubbers per ton of coal charged to the ovens. On the same basis, approximately 70 lbs. of 150 p. s. i. g. steam and 60 lbs. of 15 p. s. i. g. steam are required. Moreover, there are excessive power requirements for pumping this large volume of oil and excessive water requirements for cooling it. In addition, the apparatus required to perform the stripping operation is large and cumbersome due to the quantities handled. Moreover, in spite of the great expenditures involved, the recovery of light oils in warmer weather amounts to usually less than 90% of their content in the gas.

It is an object of this invention to provide a method and apparatus whereby a larger quantity of the total naphthalene produced in the coke ovens can be recovered as a salable product than is normally economically feasible.

It is another object of this invention to provide a method and apparatus whereby the produced gas can be drawn off relatively free from naphthalene and therefore free of any tendency to clog up fuel lines and burners.

Another object of the present invention is to provide a procedure wherein the valuable hydrocarbons are absorbed from the produced gas by means of a continuously revivified absorber oil which may be itself a product of the novel process.

It is another object of the present invention to provide a method and apparatus whereby naphthalene is recovered before it has a chance to conflict with the recovery of any of the other valuable components.

It is still another object of the invention to provide a method and apparatus for the recovery of light oils whereby only a small fraction of the present wash oil requirements will be needed, and the stripping operation steam requirements greatly reduced.

It is a further object of the invention to provide a process and apparatus whereby even under unfavorable conditions a higher proportion of the light oils present in the gases can be recovered.

It is a further object of this invention to provide a process and apparatus in which the process steps are simplified and in which equipment and piping sizes are reduced, thus providing a less costly recovery apparatus.

In the novel process the gases as they come from the coke oven are first contacted in normal manner with an aqueous liquor with resultant cooling and removal of the major portion of the tar. According to the invention, they are subsequently subjected to scrubbing with an absorber oil, with the resultant removal of naphthalene and residual tar and enrichment of the absorber oil. To the naphthalene rich absorber oil is then added a heavy carrier and the combination fractionated to separate the naphthalene from its absorber oil.

By an absorber oil is meant an oil having an initial point (atmospheric distillation) above about 225° C. and an end point not higher than about 400° C., which will take up naphthalene from the coke oven gases.

Preferably, the absorber oil will have an initial point of about 230° C. and an end point of about 300° C. Such absorber oils may, for example, be of petroleum origin or may be creosote oils obtained from distillation of the coal tar itself.

By a heavy carrier is meant a liquid hydrocarbon carrier having an end point above the end point of the absorber oil and one, at least a portion of which will remain liquid when the absorber oil is vaporized. The carrier may be of petroleum origin or may be a coal tar. Examples of suitable carriers are coke oven by-product tar, and Bunker C fuel oil of petroleum origin.

The proportion of carrier in the distilland should generally be not less than about 2% by weight. One function of the carrier is to insure that no particles of tar or pitch carried into subsequent distillation equipment will remain on any hot surface and there polymerize to coke. The minimum percent specified is considered the least quantity which will perform this function.

Where the boiling point range of the carrier is such that a part of it is vaporized with the absorber oil, the total quantity of carrier added must be such that the fraction which will remain liquid upon vaporization of the absorber oil constitutes not less than 2% of the distilland.

There is no upper limit to the quantity of carrier which may be added, but if the carrier is added solely for the purpose of preventing the coking of entrained tar and pitch, in general no more than the amount required for that purpose will be added.

It will be understood that the boiling point of the absorber oil is dependent on the nature of the carrier used and the one must be chosen with due regard to the other. Thus, if by-product tar is used as a carrier the boiling range of the absorber oil must be such that its end point is below about 335° C., in order that the absorber oil may readily be purified of the phenanthrene and anthracene, normally present in coal tars, by distillation.

In the novel process the gases, after they have been scrubbed clean of naphthalene, are subsequently scrubbed with an absorber oil to recover their light oil content. The absorber oil used in the second light oil or benzol scrubbing may be of the same type as that utilized in the first or naphthalene scrubbing.

In the preferred embodiment of the invention, the absorber oil used in both naphthalene and benzol scrubbers is a creosote oil having a boiling point range (atmospheric distillation) of from about 230° C. to about 300° C. In this embodiment, the by-product tar previously removed from the gases is used as a carrier and is combined and distilled along with the naphthalene rich absorber oil from the naphthalene scrubber. In the preferred embodiment, the mixture of naphthalene rich absorber oil and crude tar is heated and introduced to a distillation apparatus in which pitch is removed as a liquid from the base. All material boiling below the pitch and including the absorber oil passes overhead as a vapor. This vapor will normally include light oils and naphthalene as well as the absorber oil.

The invention envisions several means by which the mixture of naphthalene, light oils and absorber oil may be separated. For example, the overhead vapors mentioned may be introduced to the middle section of a fractionating column from which creosote oil, essentially free of naphthalene, is removed as a liquid from the base, and light oils and naphthalene fractionally separated from creosote oil removed overhead as a vapor.

Alternatively, the pitch free mixture of naphthalene, light oils and absorber oil may be charged to a fractionating tower from which light oils fractionally separated from naphthalene may be withdrawn overhead as a vapor, a crude naphthalene concentrate taken off as a liquid side stream, and the creosote absorber oil, free of naphthalene, removed from the base.

In the scrubbing of light oils from the coke oven gases, it will be recognized that higher pressures aid the absorption, inasmuch as the volume of absorber oil required for a given light oil recovery is roughly inversely proportional to the absolute pressure. In the novel process it is contemplated that either or both the naphthalene scrubber and the light oil scrubber may be operated under a pressure of at least above about 4 p. s. i. g.

In general, the pressure will be raised to from about 10 to about 30 p. s. i. g., but it will be understood that the upper limit is a matter of economics, with the costs of compression, steam and heat and the fuel gas demand pressure all entering into the calculations.

According to the preferred embodiment of the invention, the gases are scrubbed of their naphthalene content immediately after their treatment with the aqueous liquor, and are then passed through a pressure booster where their pressure is raised to above about 4 p. s. i. g. At this pressure they are run through the usual ammonia saturator and are then subjected to a second scrubbing with absorber oil to recover their light oil content. During the light oil scrubbing the pressure of the gases is above about 3 p. s. i. g.

Figure 1:
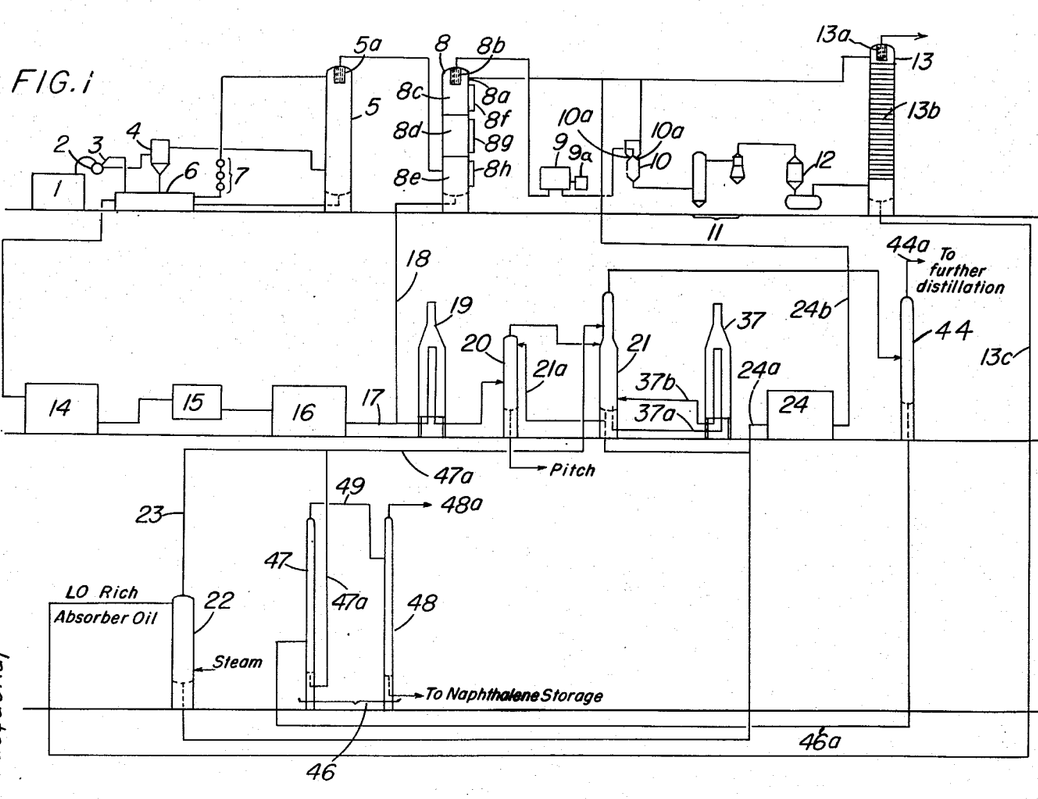
Fig. 1 is a flow diagram of a coke oven by-product plant according to the preferred embodiment of the invention.

Referring to Fig. 1, a coke oven 1 is connected directly to a collecting main 2 provided with an injector 3 for delivering flushing liquor. Immediately downstream of the main is a downcomer 4 leading the gases to primary cooler 5.

The bottom of the downcomer 4 is connected to a decanter 6. The upper level of the decanter 6 is connected directly to the collecting main 2 whereby a portion of the decanted liquor may be recycled to the collecting main for cooling and flushing.

Preferably primary cooler 5 is of the spray type. This design has greater freedom from fouling than a packed tower and also allows a close approach in temperature between the cooling liquid and the gas to be cooled. An entrainment removal device 5a is provided at the top of the primary cooler to remove entrained material from the gas leaving the cooler.

The upper portion of decanter 6 is connected to the primary cooler 5 and supplies the necessary liquor for the primary cooler sprays. Indirect coolers 7 are provided for cooling the liquor going to the primary coolers.

Downstream of the primary cooler 5 is a naphthalene scrubber 8 to which is connected a source of scrubbing oil as at 8a. An entrainment removal device 8b is provided within the scrubber for removal of entrained material from the gas leaving the scrubber.

The naphthalene scrubber 8 comprises three scrubbing chambers 8c, 8d, 8e. Recirculation means 8f, 8g, 8h are provided for continuously collecting absorber oil from the bottom of each chamber and returning it to sprays (not shown) at the top of each chamber.

Immediately downstream of the naphthalene scrubber are a booster 9, intermediate cooler 10 and ammonia saturator 11. The booster 9 is preferably of centrifugal design and may be driven by a steam turbine 9a.

Intermediate cooler 10 is preferably of the indirect type. Creosote oil sprays 10a may be provided at the top of the cooler to keep the gas side cooling surfaces clean.

Ammonia saturator 11 follows the intermediate coolers.

From the ammonia saturator the gases pass through final cooler 12 which is similar in type of construction to the intermediate cooler 10, and thence into benzol scrubber 13. The benzol scrubber preferably contains a number of bubble trays 13b. An entrainment removal device 13a may be provided at the gas exit from the benzol scrubber to eliminate loss of scrubbing oil to the fuel gas lines.

In normal by-product recovery systems it is not practicable to use a bubble plate light oil scrubbing column. Particularly, it would not be feasible to use such equipment in a normal process where it was attempted to operate at elevated pressure. If such attempt were made, the column would soon clog up with naphthalene and sludge, because the wash oil is not regenerated by distillation.

In the present process, however, because the naphthalene is substantially all removed before the gases come to the benzol scrubber, and because the wash oil is continuously regenerated by distillation, there is no danger of clogging, and the more efficient bubble plate design may be operated under higher and more efficient pressures.

The tar level of the decanter 6 is connected to a wet tar storage tank 14. For purification of the wet tar, a centrifugal separator 15 may be connected to the wet tar storage tank 14. From the centrifugal separator 15, the tar, purified of entrained moisture, is led to a dry tar storage tank 16.

Downstream of dry tar storage tank 16 is a heater 19. A line 18 is provided leading from the bottom of naphthalene scrubber 8 to the heater 19. A line 17, connected to dry tar storage tank 16, merges with the line 18, and provides a means whereby a mixture of naphthalene rich absorber oil from the scrubber 8 and tar from storage tank 16 can be fed to heater 19.

An evaporator 20 receives the hot mixture from the heater 19. Connected to the top of evaporator 20 is a fractionator 21. A connection 21a is provided for returning a portion of the bottoms from the fractionator 21 to the top of evaporator 20 as reflux.

To provide the necessary heat for fractionator 21, a reboiler 37 is provided, a connection 37a being made between the bottom of the fractionator 21 and the reboiler, and connection 37b being provided to return heated material to fractionator 21.

Further fractionation is carried out in BTX (benzene, toluene, xylene)-naphthalene fractionator 44, to which is fed the overhead from fractionator 21. Means 44a are provided for sending the overhead from BTX-naphthalene fractionator 44 to further distillation equipment (not shown).

A line 46a is provided for delivering the crude naphthalene bottoms from BTX-naphthalene fractionator 44 to a naphthalene separation system, indicated generally as 46. In general, the naphthalene separation system comprises two fractionators, a primary fractionator 47 and a secondary fractionator 48. A line 49 is provided for feeding the overhead from the primary fractionator 47 to a point near the top of the secondary fractionator. A connection 47a is made between the bottom of the primary fractionator 47 and a point on the fractionator 21. A line 48a is provided for conveying the overhead from the secondary fractionator 48 to further distillation equipment (not shown).

A light oil stripper 22 is connected to the bottom of the benzol scrubber 13 by line 13c and the overhead from the stripper is charged through line 23 and line 47a to a point on the fractionator 21. A line 24a is provided for sending the bottoms from the fractionator 21 and the light oil stripper 22 to creosote oil storage tank 24. A connection 24b is made from the creosote oil storage tank 24 to the top of the naphthalene scrubber 8 and the top of the benzol scrubber 13.

Figure 2:
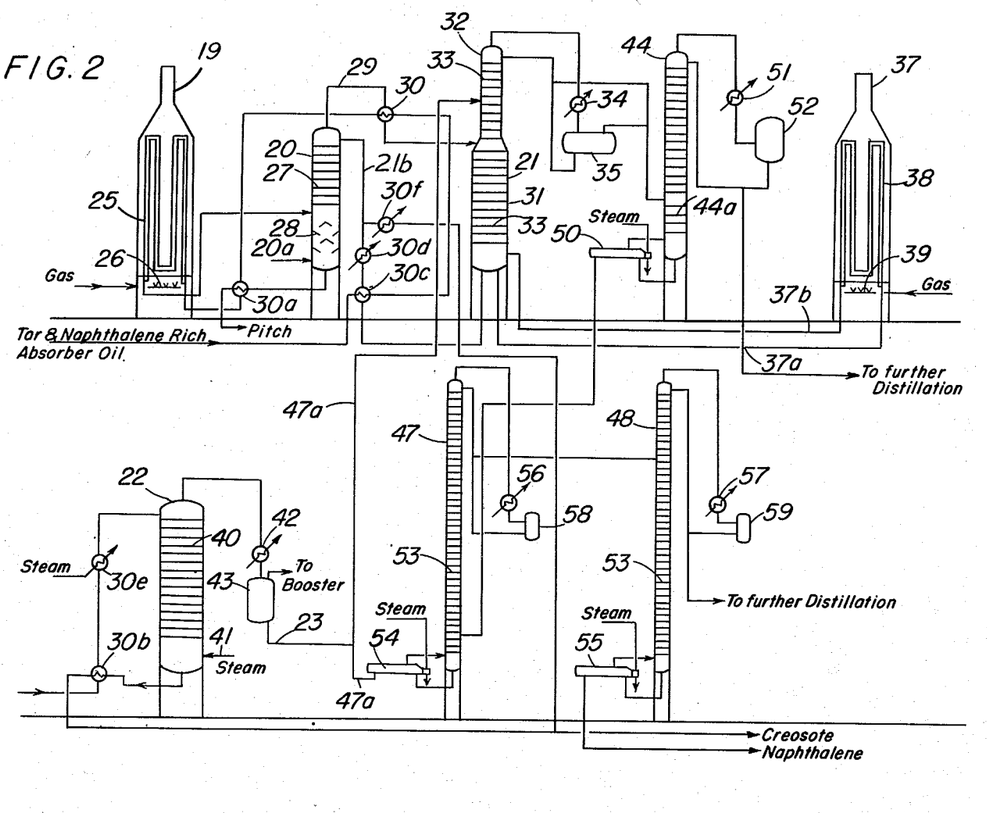
Fig. 2 is a flow diagram showing in greater detail the preferred method for the distillation of the mixture of tar and naphthalene rich absorber oil according to the invention.

In Fig. 2, the distillation apparatus described above is shown in more detail. Referring to that figure, it will be seen that the heater 19 comprises a series of tubes 25 heated by burners 26 which may be supplied with produced gas ultimately drawn from the top of benzol scrubber 13 shown in Fig. 1. Evaporator 20 comprises a number of bubble plates 27 and disc and doughnut baffles 28. Live steam may be introduced to evaporator 20 below the bottom baffle through line 29a. The overhead from evaporator 20 is drawn off through line 29 in which is interposed heat exchanger 30, and passed to the mid-portion of fractionator 21. Fractionator 21 consists of a lower portion 31 and an upper portion 32. Both sections include a number of bubble plates 33. A condenser 34 and a gas separator 35 are provided for the overhead from the fractionator 21, the liquid level of the gas separator 35 being connected to a point above the uppermost plate of fractionator 21 for reflux. A connection 21b is made from below the bottom plate of fractionator 21, passing through heat exchanger 30c and cooler 30d, to a point on the evaporator 20 just above the uppermost plate to furnish reflux to evaporator 20. A reboiler 37, similar to feed heater 19 and consisting of a series of tubes 38 and burners 39, is connected to the bottom of fractionator 21 with line 37a. The heated material is returned to column 21 through line 37b.

The BTX-naphthalene fractionator 44 contains a number of bubble plates 44a. It is further provided with a heated reboiler 50, and a condenser 51 and reflux accummulator 52 for its overhead.

The naphthalene separation system 46, as pointed out above, comprises a primary fractionator 47 and a secondary fractionator 48. Both of these naphthalene fractionators contain a series of bubble plates 53. Both fractionators have heated reboilers 54 and 55, and reflux means comprising condensers 56 and 57 and accumulators 58 and 59.

The light oil stripper 22 contains a series of bubble plates 40. A steam inlet 41 is provided below the bottom plate. A condenser 42 and accumulator 43 are provided for the overhead. The accumulator may further be connected to the suction of booster 9 to obtain the advantage of reduced pressure on the stripper. A connection is made between the bottom of the accumulator 43 and a point on the fractionator 21, several plates below the top. This connection provides means for the fractional separation of the light oil, naphthalene and absorber oil removed as the overhead from the stripper, in the same distillation apparatus already provided for the separation of these materials, as obtained from the naphthalene rich absorber oil and the crude tar mixture.

In operating the device shown in Figs. 1 and 2, the gases drawn from the coke oven at a temperature of above about 800° C. are met with an aqueous flushing liquor in the collecting main 2. By contact with this liquor, the temperature of the gases is reduced to from about 60 to about 100° C., a portion of the ammonia in the gases is absorbed and some of the tar and naphthalene is condensed. The foul flushing liquor together with its tar and naphthalene and the absorbed ammonia passes through downcomers 4 into the decanter 6. There it separates into a tar layer and a water layer, the water layer being reused as flushing liquor in the main 2. The gases from the downcomers pass upwardly through the primary coolers 5 where they are again contacted with a water spray. The liquid for the primary cooler sprays may also be drawn from decanter 6. It is cooled as by passage through coolers 7. The temperature of the gases leaving the top of the primary cooler is from about 20 to about 40° C. Their naphthalene content is from about 50 to about 250 grains per hundred cubic feet.

The gases are next passed upwardly through naphthalene scrubber 8 where they are met with a stream of creosote absorber oil produced from the by-products themselves.

The volume of fresh wash oil used in naphthalene scrubber 8 is relatively small, amounting to from about 1 to about 10 gals. per ton of coal charged. From about 500 to about 2000 gals. are recirculated in each scrubbing chamber, per ton of coal. Nevertheless, in addition to removing at least 95% of the naphthalene, the naphthalene scrubber removes a substantial portion of the heavier homologs of the light oils, this proportion increasing with the molecular weight of the homolog.

The removal of the heavier homologs in the naphthalene scrubber provides an advantage in economy of the process. When so separated they may be distilled from the naphthalene rich absorber oil in the equipment generally described above, whereas had they been permitted to pass onward to the benzol scrubbers and subsequently recovered by steam stripping from the benzol scrubber rich oil, they would have required an inordinately large amount of steam for their removal from the rich oil. The prior removal of these heavier homologs permits a great saving in stripping steam requirements in the operation of the stripper used with the benzol scrubber.

The clean gas passing out of the top of the naphthalene scrubber is at a temperature of from about 20 to about 40° C. Its naphthalene content is in the neighborhood of from about 1 to about 5 grains per hundred cubic foot. It will be understood that the extent to which the naphthalene is removed in the naphthalene scrubber is dependent on the purity of the fresh feed absorber oil in respect to naphthalene contamination.

The pressure of the gas leaving the naphthalene scrubber is in the neighborhood of from five to about fifty inches of water below atmospheric pressure. It is passed through boosters 9 where its pressure is raised to above about 4 p. s. i. g. As a result of the compression, the temperature of the gas is raised to above about 60° C. From the booster, the gas is delivered to an intermediate cooler 10 where its temperature is reduced to from about 50 to about 80° C. It is then delivered to ammonia saturator 11 where the ammonia is removed. Leaving the ammonia saturator, the temperature of the gases is still from about 50 to about 80° C. They are therefore passed to a final cooler 12 wherein their temperature is again brought down to from about 20 to about 40° C. At this temperature and at a pressure of above about 3 p. s. i. g., the gases are passed upwardly through benzol scrubber 13 where their light oil content is removed by contact with a creosote wash oil of the same nature as that used in naphthalene scrubber 8. From the benzol scrubber the gases emerge clean and dry at a pressure of above about 3 p. s. i. g., and are ready to be passed directly to the fuel mains and burners.

As pointed out above, decanter 6 contains a water layer and a tar layer. The tar layer is drawn off and charged to wet tar storage tank 14. At this stage it still contains from about 3 to about 15%, generally about 5%, by weight of water and a certain amount of solid impurities. To eliminate the water and solid impurities the wet tar is charged to centrifugal separator 15 where its water content is reduced to below about 2% and entrained solids are substantially reduced.

Clean tar from separator 15 is charged to dry tar storage tank 16. From there it is combined with the naphthalene rich absorber oil drawn from naphthalene scrubber 8 and the combined streams, after passing through heat exchangers 30c, 30 and 30a, are charged to heater 19 where their temperature is raised to from about 300 to about 370° C. They are then sent to evaporator 20, entering the evaporator at a point below the lowest bubble plate. The bottoms from the evaporator 20 at a temperature of from about 280 to about 350° C., are drawn off and after giving up a portion of their heat to the fresh charge are sent to pitch storage, not shown. If desired, live steam may be introduced to evaporator 20 through connection 20a.

The overhead from the evaporator 20 emerging at a temperature of from about 280 to about 330° C., after giving up a portion of its heat to the fresh charge in heat exchanger 30 is delivered to the mid-point of fractionator 21 at a temperature of from about 230 to about 300° C.

A portion of the bottoms from the fractionator 21 at a temperature of from about 230 to about 300° C. are drawn off and after giving up a certain amount of their heat to the fresh feed in heat exchanger 30c, and after being cooled in cooler 30d, are refluxed to evaporator 20 at a point just above the uppermost plate.

A reflux ratio calculated to prevent passage of anthracene and phenanthrene overhead is maintained on the evaporator. The end point of the creosote oil removed from the base of the fractionator 21 is held to an upper limit of about 335° C. It is this product which is employed as an absorber oil in the naphthalene and benzol scrubbers.

A second bottoms stream from fractionator 21 is passed through reboiler 37 and is recharged to the bottom of the fractionator at a temperature of from about 260 to about 340° C. The naphthalene content of the creosote oil produced at the base of fractionator 21 should, for best performance, be less than about 1%.

The overhead from the fractionator 21 is condensed in condenser 34 and passed to gas separator 35 from which a reflux stream is returned to the top of the fractionator 21 at a point above the uppermost plate. The temperature of the overhead as it leaves the fractionator is from about 140 to about 220° C. That portion of the overhead which is not refluxed to fractionator 21 is charged directly to BTX-naphthalene fractionator 44.

The light oil rich absorber oil from benzol scrubber 13 after being heated in heat exchanger 30b and steam heater 30e to a temperature of from about 120° to about 220° C., is delivered to the top of light oil stripper 22. Low pressure steam is delivered to a point below the bubble plates of the stripper and passes upwardly, removing the light oils from the heavier absorber oil. The overhead from the light oil stripper at a temperature of from about 120 to about 210° C. is condensed in condenser 42 and a separation is made between the light oils and the water in accumulator 43. To cleanse the light oil, which at this point is still contaminated with creosote wash oil, it may be delivered to a point on the upper portion of fractionator 21 several plates below the top. Thus, the creosote oil contaminant is returned to its proper stream. Bottoms from the stripper consisting of the lean absorber oil, after giving up its heat to the fresh charge, is delivered to absorber oil storage tank 24.

As pointed out above, the overhead from the fractionator 21 is charged directly to the BTX-naphthalene fractionator 44. The overhead from the BTX-naphthalene fractionator 44 comprises light oils substantially free of naphthalene; its bottoms stream is a crude naphthalene containing, for example, about 80% naphthalene. The overhead is taken off at from about 80 to about 110° C., is condensed in condenser 51 and sent to accumulator 52, where any water present may be separated from the light oils. A portion of the liquid from the accumulator is refluxed. That portion of the light oils which is not refluxed is sent to further fractionation (not shown).

The portion of the bottoms from the fractionator 44 which is not returned to the fractionator 44 as vapor from the reboiler 59 is passed to the naphthalene separation system 46 for further refining. It enters primary fractionator 47 at a temperature of from about 200 to about 240° C. A partial reflux of the overhead from the primary fractionator 47 is returned to a point directly above the uppermost tray.

That portion of the bottoms from fractionator 47 not returned to the primary fractionator 47 as vapor from reboiler 54 is returned to fractionator 21 with the overhead from the light oil stripper for redistillation. That portion of the overhead from primary fractionator 47 which is not refluxed is delivered to a point toward the top of secondary fractionator 48.

A reflux stream is returned to above the top plate of the secondary fractionator 48. That portion of the overhead from the secondary fractionator which is not refluxed is delivered to further distillation equipment (not shown).

The product removed from the bottom of secondary fractionator 48 is substantially pure naphthalene and may be sent directly to naphthalene storage.

To further describe the operation of the apparatus shown in Figs. 1 and 2, the following specific example is given:

*Example*

On the basis of one ton of coal fed to the ovens, the gas entering the collecting main 2 may have the following composition:

| | | |
|---|---|---|
| Fuel gas | cu. ft. | 11,000 |
| Light oils | gallons | 3.15 |
| Naphthalene | do | 0.6 |
| Creosote oil | do | 0.3 |
| Pitch | do | 5.0 |

From the primary cooler the gases are sent through naphthalene scrubber 8. Approximately 7 gals. of fresh creosote absorber oil are delivered to the naphthalene scrubber. About 1200 gals. of absorber oil are continuously recirculated in each of the spray chambers 8c, 8d and 8e. The absorber oil is derived from the separated tar. It has a boiling point range of from about 230 to 300° C. (atmospheric distillation) and contains less than 1% naphthalene. Treatment in the naphthalene scrubber 8 effectively removes most of the naphthalene from the gas, and passing out of the naphthalene scrubber the naphthalene content of the gas is less than about 2 grains per hundred cu. ft., i. e. less than about 2% of the naphthalene present in the gases as they come from the primary cooler.

As they leave the naphthalene scrubber the gases are at a pressure of 22 inches of water below atmospheric pressure. They are put through booster 9 where their pressure is raised to 12 p. s. i. g. The corresponding increase in temperature raises the gas temperature to 116° C. In the intermediate cooler this temperature is reduced to 60° C.

The gases are then passed through ammonia saturator 11 and charged to final cooler 12 where their temperature is further reduced to about 30° C.

The gases, now at a pressure of 11 p. s. i. g., are run through benzol scrubber 13. To remove the light oils from the gases about 90 gals. of the same creosote absorber oil used in the naphthalene scrubber are contacted with the gases in benzol scrubber 13. This removes all but about 5% of the light oils present in the gases. The gases emerging from the benzol scrubber have a pressure of about 10 p. s. i. g., are at a temperature of 30° C. and consist substantially of the 11,000 cu. ft. of fuel gas originally charged to the system.

The tar settling in decanter 6 consists substantially of about 0.55 gal. of naphthalene, 0.3 gal. of creosote oil and 5.0 gals. of pitch. It has a water content of about 5%. In the centrifugal separator 15 this water content is reduced to less than 2%.

The dry tar is combined with the rich absorber oil from naphthalene scrubber 8 and sent to heater 19 where it is brought to a temperature of about 343° C. The hot combined streams are then fed to evaporator 20. At this point the composition of the combined streams is as follows:

| | Gallons |
|---|---|
| Light oils | 0.7 |
| Naphthalene | 0.6 |
| Creosote oil | 7.3 |
| Pitch | 5.0 |

The bottoms taken off the evaporator is at a temperature of about 327° C. It consists substantially entirely of pitch. The overhead from the evaporator is removed at a temperature of about 307° C. It consists essentially of

| | Gallons |
|---|---|
| Light oils | 0.7 |
| Naphthalene | 0.6 |
| Creosote oil (with reflux) | 10.5 | and after cooling to about 271° C. is charged to fractionator 21.

Turning to the light oil rich absorber oil removed from the light oil scrubber 13, this stream is brought to a temperature of about 171° C. in heat exchanger 30b and steam heater 30e and is charged to light oil stripper 22. Its composition at this point is substantially:

| | Gallons |
|---|---|
| Light oil | 2.3 |
| Creosote oil | 90.0 |

About 10 lbs. of 15 p. s. i. g. steam is charged to the base of stripper 22. The bottoms stream consists of light oil free creosote oil. The overhead at a temperature of about 168° C. is condensed and freed from water. The resulting liquid product having a composition of

| | Gallons |
|---|---|
| Light oils | 2.3 |
| Creosote oil | 2.3 | and is charged to a point on the fractionator 21.

The bottoms of fractionator 21, consisting of substantially pure creosote oil, is divided into three parts. A first portion is sent through reboiler 37 where its temperature is raised to about 293° C. and it is returned to the base of fractionator 21. The molal reboil ratio, vapor to bottoms of product, is about 2.2. A second portion is refluxed to the upper tray of evaporator 20, the reflux ratio $$\left(\frac{\text{reflux}}{\text{overhead}}\right)$$

on evaporator 20 being maintained at about 0.3. A third portion is cooled in cooler 30f and sent to storage.

The overhead from fractionator 21 is removed at a temperature of about 177° C. It is partially condensed and about 1.5 gals. is refluxed to the upper tray of fractionator 21.

The overhead from fractionator 21 is charged to BTX-naphthalene fractionator 44. Its composition entering the tower 44 is as follows:

| | Gallons |
|---|---|
| Light oils | 3.0 |
| Naphthalene | 0.6 |
| Creosote oil | 0.06 |

The overhead removed from BTX-naphthalene fractionator 44 at a temperature of about 93° C. consists substantially entirely of about 2.94 gals. of the light oils originally removed from the gases.

A portion of the overhead is refluxed, the reflux ratio (reflux/product) being about 0.5. A portion of the bottoms from fractionator 44 is reboiled, the reboil ratio (vapor/bottoms product) being about 3. Another portion is delivered to primary naphthalene fractionator 47 at a temperature of about 221° C. The composition of the material charged to fractionator 47 is as follows:

| | Gallons |
|---|---|
| Naphthalene | 0.6 |
| Light oils | 0.06 |
| Creosote oils | 0.06 |

The overhead from primary naphthalene fractionator 47 has a content of

| | Gallons |
|---|---|
| Naphthalene | 1.2 |
| Light oils | 0.12 |

It is condensed and a portion returned to the fractionator as reflux, the reflux ratio (reflux/product) being about 1.0. That portion not refluxed is charged to secondary naphthalene fractionator 48.

The bottoms from the primary fractionator 47 consists essentially of the 0.06 gal. of creosote oil charged thereto. It is returned to fractionator 21 for redistillation.

The charge entering secondary naphthalene fractionator 48 consists of

| | Gallons |
|---|---|
| Naphthalene | 0.6 |
| Light oils | 0.06 |

A reflux is performed on the secondary fractionator, the ratio being about 4.0. The bottoms removed from the secondary fractionator consists of 0.6 gal. of essentially pure naphthalene.

Figure 3:
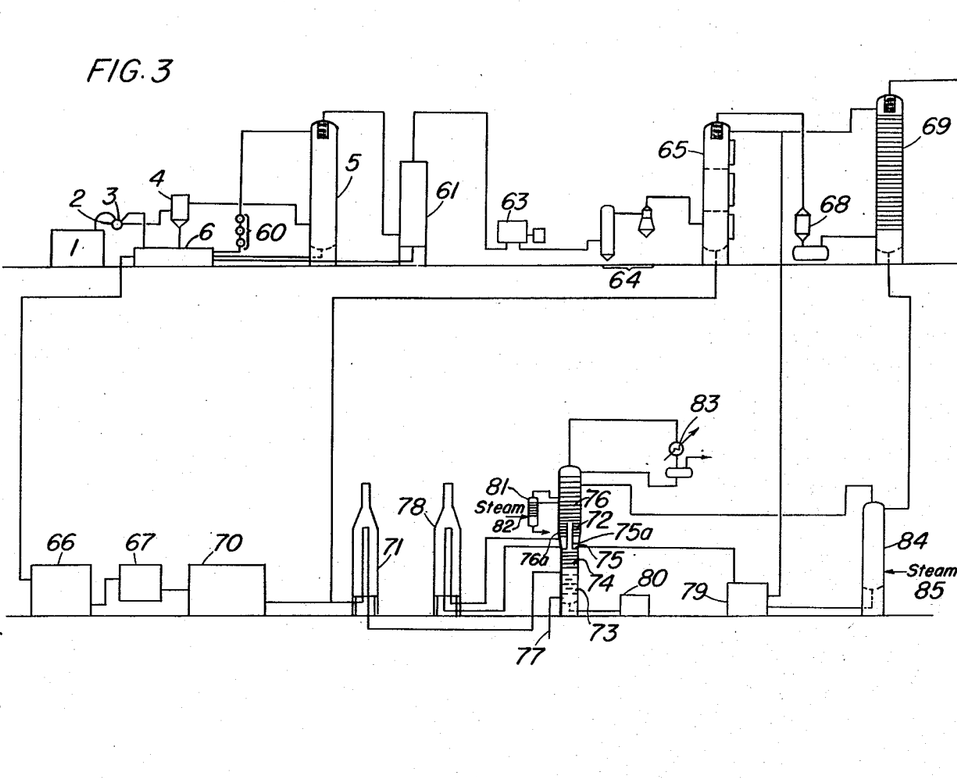
Fig. 3 is a flow diagram of a modified form of the invention wherein naphthalene is not separated until after ammonia removal.

While the process and apparatus described above and illustrated in Figs. 1 and 2 is the preferred embodiment of my invention, it is possible to obtain many benefits of the invention with certain modifications in the plant lay-out used. One such modification is shown in Fig. 3.

As will appear from a study of that figure, the naphthalene is removed from the gases by scrubbing with a creosote absorber oil after, rather than before, the ammonia has been removed in the ammonia saturators. Referring to Fig. 3, the hot gases from coke oven 1 pass overhead into a collecting main 2. Here they are met with a spray of aqueous flushing liquor, which cools the gases and at the same time absorbs a considerable part of their ammonia content and condenses much of their tar. The mixture of tars and ammoniacal washing liquor passes from the main through downcomer 4 into decanter 6 where it forms an aqueous top layer and a tarry lower layer. A portion of the aqueous layer is used again for flushing in the collecting main 2.

The gases, now cooled to a temperature of from about 60 to about 100° C., move from the main 2 to a primary cooler 5 where they are contacted with more ammoniacal washing liquor. The liquor from primary cooler 5 is charged to decanter 6. The water layer from decanter 6 is recirculated to the primary cooler after being cooled in coolers 60. From the primary cooler the gas, now cooled to from 20 to 40° C., next passes through an electrostatic precipitator 61 where any remaining particles of tar or solid substances are removed.

A booster or pump 63 is inserted in the line after the tar precipitation apparatus to raise the pressure of the cooled gases to above about 4 p. s. i. g.

After passing through booster 63, the gas is treated with sulphuric acid in a saturator 64, to remove ammonia present.

According to this embodiment of the invention, the gases now free from ammonia and tar and at a temperature of from about 50 to 80° C. are treated in a naphthalene scrubber 65 with a creosote absorber oil. The naphthalene rich absorber oil from the bottom of the scrubber 65 is then combined with tar from the bottom of the decanter 6 and the resultant mixture fractionated.

After passing from the naphthalene scrubber 65, the gases, now clean of naphthalene and at a temperature of from about 50 to 80° C., are passed through a final cooler 68 where their temperature is reduced to from about 20 to about 40° C. and charged to light oil scrubber 69 where they are contacted with a creosote absorber oil identical with that used in the naphthalene scrubber 65. After passing through the light oil scrubber, the gases may be put in storage, or used directly as fuel.

The tar from decanter 6, before being combined with the stream from the bottom of scrubber 65, is charged to wet tar storage tank 66 and thence to centrifugal separator 67 where it is purified of water and entrained solids. The dry tar is stored in tank 70. The combined tar from tank 70 and naphthalene rich absorber oil from scrubber 65 are passed through a fired heater 71 where their temperature is raised to from about 300 to about 370° C. At this temperature they are then charged to heavy oils fractionator 72.

The light oil rich absorber oil from scrubber 69 is charged to a light oil stripper 84. Live steam is introduced to the stripper as at 85. The bottoms from the stripper consisting of light oil free absorber oil is sent to absorber oil storage 79, for further use in scrubbers 65 and 69. The light oil overhead from the stripper is passed to fractionator 72 at a point near the top for further purification.

Heavy oils fractionator 72 comprises several distinct sections. On the lowest part of the tower are a series of discs and doughnut baffles 73. Immediately above the baffles are installed a first series of bubble plates 74. Directly above them is an accumulator pan 75. In the top of the tower and separated from the first series of plates by the accumulator pan is a second series of bubble plates 76.

The hot feed from heater 71 is fed to fractionator 72 at a point directly above the baffles. Provision is made for introducing steam to a point below the baffles as at 77.

The lower portion of fractionator 72 containing baffles 73 and bubble plates 74 serves to remove pitch from the charge. The pitch so removed is drawn off as a bottoms stream and sent to pitch storage tank 80. The lower boiling constituents are vaporized and pass up through the central pipe 75a of the accumulator pan 75. The creosote oil portion of the vapor is condensed and descends to the accumulator pan.

The creosote oil on pan 75 will have a boiling point range of from about 230 to about 300° C. One portion of the oil is sent through a reboiler 78 and returned to the fractionator at a temperature of from about 260 to about 340° C. A second portion of the creosote oil is sent back to the plates 74 through an overflow pipe (not shown) in the accumulator pan 75. A third portion of the creosote oil is drawn off the accumulator pan and sent to storage tank 79 for use as the absorber oil in scrubbers 65 and 69.

Naphthalene is prevented from passing overhead from the top of tower 72 by refluxing part of the condensed overhead product of the tower. On the other hand, naphthalene is prevented from reaching the accumulator pan 75 by vapors passing upward through the descending liquid on bubble trays 76a. It must therefore be removed as a side stream at an intermediate point in bubble trays 76 where its concentration is a maximum. At this point a naphthalene rich side stream is withdrawn at a temperature of from about 170 to about 230° C. and sent to a naphthalene stripper 81. Steam is charged to the stripper as at 82 to remove light oil contaminants from the side stream and these are returned to the tower 72, and a naphthalene rich stream is withdrawn from the base of the stripper for further fractionation.

The overhead from heavy oil fractionator 72 consisting mainly of light oils at a temperature of from about 70 to about 120° C. is condensed in condenser 83. A portion of the condensate is returned to the top tray of fractionator 72 as reflux; the remainder is sent to further fractionation equipment (not shown).

In the process and apparatus described, a higher proportion of the valuable coke oven by-products can be recovered than has hitherto been economically feasible. In particular, the addition of a heavy carrier to the naphthalene rich absorber oil from the naphthalene scrubber enables an efficient distillation system to be operated for the separation of the naphthalene from its absorber oil. Such a distillation system provides a source of high purity, continuously revivified absorber oil which is able to economically recover more of the valuable by-products than has been possible under existing systems.

Furthermore, the removal of naphthalene prior to the light oil scrubbers results in important advantages. In the first place, it eliminates the danger of clogging in downstream apparatus, thus reducing maintenance costs. Secondly, it permits the use of more efficient bubble plate light oil scrubbers, and especially the use of high pressure in such scrubbers, thus increasing the efficiency of the scrubbing operation.

Moreover, all of the above facts which raise the efficiency of separating naphthalene from the gases, at the same time aid in preventing the carry over of any substantial quantity of that substance into the gas mains, thus avoiding the clogging of those mains and the burners supplied thereby.

Furthermore, in the preferred embodiment of the invention where the tar is used as a heavy carrier and distilled along with the naphthalene rich absorber oil, substantially all of the naphthalene present in the tar, which represents a large fraction of the total naphthalene present in the hot gases, is recovered. In addition, through distillation of the tar, a creosote oil is produced which may advantageously be used as the absorber oil in both naphthalene and light oil scrubbers, thus eliminating the expense of petroleum wash oils. The objections usually raised to the use of creosote absorber oils, namely, their tendency to polymerize, are overcome in the present invention by the continuous regeneration to which a portion of the oil is always subjected. Thus full advantage can be taken of the greater inherent absorbtivity of the creosote oils.

Moreover, since in the invention the gases are subjected to a preliminary treatment with absorber oil before passing through the light oil scrubbers, the heavier homologs of the light oils do not pass into the light oil stripper and therefore a much smaller quantity of steam is necessary in the operation of that piece of equipment. In addition, when the light oils are removed under elevated pressure, a greatly reduced quantity of absorber oil need be used, a factor which still further reduces the steam requirement in the light oil stripper. Likewise, under elevated pressure, smaller apparatus and piping is possible.

Finally, where, as in the preferred embodiment of the invention, the separation of products from the tar and those recovered from the gases is concentrated in a single distillation system, each constituent is recovered in a single stream. For this reason and because the novel process makes possible the use of more efficient recovery equipment, the quantity and sizes of equipment and piping are much less than normal, resulting in a less costly recovery plant.

What I claim is:

1. In a process for the recovery of by-products from hot coke oven gases, the steps of contacting said gases with an aqueous liquor, subsequently contacting said gases with a substantially naphthalene-free absorber oil having an initial point above about 225° C. and an end point not higher than about 400° C. to remove naphthalene therefrom with consequent enrichment of said absorber oil, and distilling at least a portion of the naphthalene-rich absorber oil in the presence of a liquid hydrocarbon carrier having an end point above the end point of the absorber oil, at least a portion of which carrier will remain liquid when the absorber oil is vaporized.

2. In a process for the recovery of by-products from hot coke oven gases, the steps of contacting said gases with an aqueous liquor to remove tar therefrom, subsequently contacting said gases with a substantially naphthalene-free absorber oil having an initial point above about 225° C. and an end point not higher than about 335° C. to remove naphthalene therefrom with consequent enrichment of the absorber oil, and distilling at least a portion of the naphthalene-rich absorber oil in the presence of at least a portion of the tar previously removed.

3. In a process for the recovery of by-products from hot coke oven gases, the steps of contacting the gases with an aqueous liquor, subsequently contacting the gases with a substantially naphthalene-free absorber oil having an initial point above about 225° C. and an end point not higher than about 400° C. to remove naphthalene therefrom with consequent enrichment of the absorber oil, raising the pressure of the gases, contacting the gases at a pressure of above about 3 p. s. i. g. with a substantially naphthalene and light oil free absorber oil having an initial point above about 225° C. and an end point not higher than about 400° C. to remove light oils therefrom, and distilling at least a portion of the naphthalene-rich absorber oil in the presence of a liquid hydrocarbon carrier having an end point above the end point of the absorber oil, at least a portion of which carrier will remain liquid when the absorber oil is vaporized.

4. A process as claimed in claim 3 wherein said distillation is carried out in a distillation column and including the steps of separating the light oils from their absorber oil and adding the light oil so separated to the distillation column wherein the said liquid hydrocarbon carrier and naphthalene-rich absorber oil are undergoing distillation.

5. In a process for the recovery of by-products from hot coke oven gases, the steps of contacting the gases with an aqueous liquor to remove tar therefrom, subsequently contacting the gases with a substantially naphthalene-free absorber oil having an initial point above about 225° C. and an end point not higher than about 335° C. to remove naphthalene therefrom with consequent enrichment of the absorber oil, raising the pressure of the gases, contacting the gases at a pressure of above about 3 p. s. i. g. with additional absorber oil to remove the light oils therefrom, and distilling at least a portion of the naphthalene-rich absorber oil in the presence of at least a portion of the tar previously removed.

6. A process as claimed in claim 5 wherein the pressure of the gases is from about 8 to about 30 p. s. i. g.

7. In a process for the recovery of by-products from hot coke oven gases, the steps of contacting said gases with an aqueous liquor, subsequently contacting the gases with a substantially naphthalene-free absorber oil having an initial point above about 225° C. and an end point not higher than about 400° C. to remove naphthalene therefrom with consequent enrichment of said absorber oil, contacting the gases with additional absorber oil to remove light oils therefrom, and distilling at least a portion of the naphthalene-rich absorber oil separated from the gases in admixture with a liquid hydrocarbon carrier having an end point above the end point of the absorber oil, at least a portion of which carrier will remain liquid when the absorber oil is vaporized, said distillation comprising a first stage wherein said carrier is removed from the mixture and a second stage wherein the carrier-free mixture is separated into the absorber oil and a lower boiling portion.

8. A process as claimed in claim 7 wherein the gases are contacted with the absorber oil for the removal of light oils at a pressure of above about 3 p. s. i. g.

9. A process as claimed in claim 7 wherein the gases are contacted with the absorber oil for the removal of light oils at a pressure of from about 8 to about 30 p. s. i. g.

10. In a process for the recovery of by-products from hot coke oven gases, the steps of contacting said gases with an aqueous liquor to remove tar therefrom, contacting the gases with an absorber oil to remove naphthalene therefrom with the consequent enrichment of said absorber oil, removing ammonia from the gases, contacting the gases with additional absorber oil to remove light oils therefrom, and distilling at least a portion of the tar in admixture with at least a portion of the naphthalene-rich absorber oil separated from the gases, said distillation comprising a first stage wherein pitch is removed from the mixture, a second stage wherein the pitch-free mixture is separated into a creosote oil having an end point below about 335° C. and a lower boiling portion and a third stage wherein said lower boiling portion is separated into a naphthalene-rich portion and a portion rich in benzene, toluene, and xylene; separating the light oil from its absorber oil and adding the separated light oil to the second stage of said distillation process.

11. In a process for the recovery of by-products from hot coke oven gases, the steps of contacting said gases with an aqueous liquor to remove tar therefrom, contacting the gases with a substantially naphthalene-free creosote absorber oil having an initial point above about 225° C. and an end point not higher than about 335° C. to remove naphthalene therefrom with consequent enrichment of said absorber oil, contacting the gases with a substantially naphthalene and light oil free absorber oil having an initial point above about 225° C. and an end point not higher than about 335° C. to remove light oils therefrom, and continuously distilling at least a portion of the tar in admixture with at least a portion of the naphthalene rich absorber oil separated from the gases, said distillation comprising a first stage wherein pitch is continuously removed from the mixture and a second stage wherein the pitch-free mixture is continuously separated into a creosote oil having an end point below about 335° C. and a lower boiling portion, said creosote oil being continuously recycled for use as the absorber oil in removing naphthalene and light oils from fresh coke oven gas.

GERALD L. EATON.

References Cited in the file of this patent

UNITED STATES PATENTS

| Number | Name | Date |
|---|---|---|
| 1,307,534 | Becker | June 24, 1919 |
| 1,624,206 | Bjerregaard | Apr. 12, 1927 |
| 1,932,076 | Kemmer | Oct. 24, 1933 |
| 1,993,344 | Jacobson | Mar. 5, 1935 |
| 2,010,003 | Becker | Aug. 6, 1935 |
| 2,198,743 | Schuftan | Apr. 30, 1940 |
| 2,419,225 | Mitchell et al. | Apr. 22, 1947 |
| 2,458,505 | Denig | Jan. 11, 1949 |

FOREIGN PATENTS

| Number | Country | Date |
|---|---|---|
| 369,300 | Germany | Feb. 17, 1923 |
| 596,133 | Germany | Apr. 27, 1934 |